(No Model.)
E. VERSTRAETE.
UNDERGROUND CONDUIT FOR ELECTRIC CONDUCTORS.
No. 294,703. Patented Mar. 4, 1884.
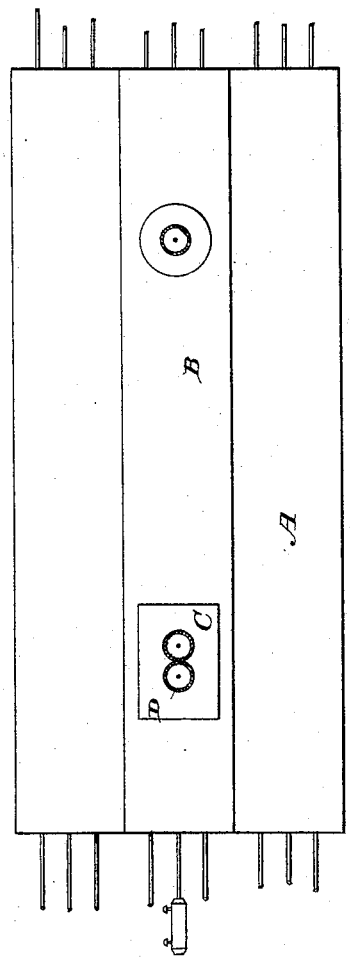
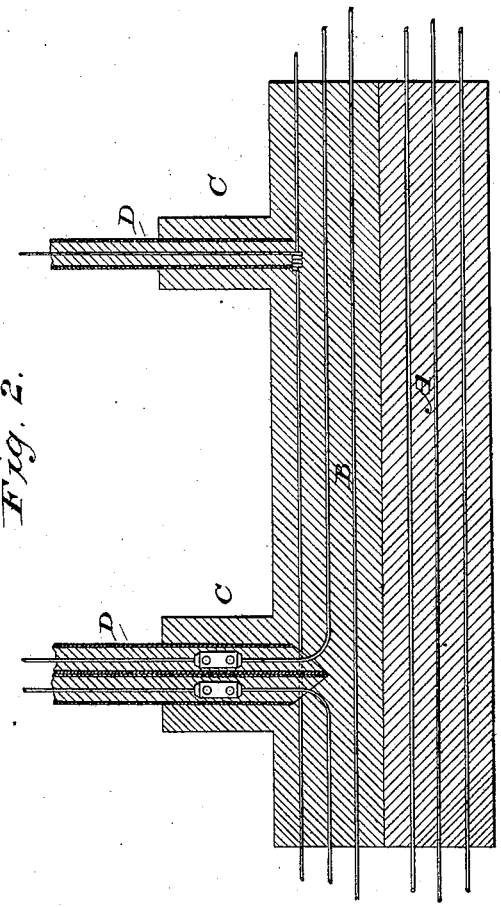
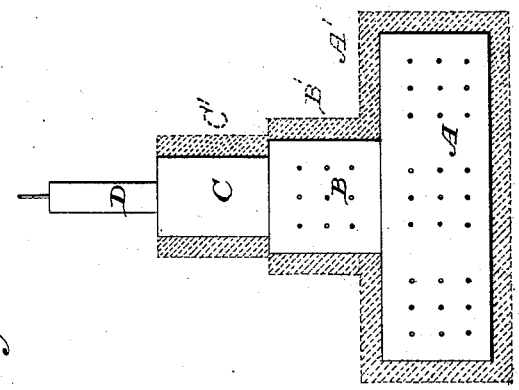
WITNESSES
Wm A. Skinkle
Wm B. Musser
INVENTOR
Edemond Verstraete
By his Attorney
Frankland Jannus

UNITED STATES PATENT OFFICE.

EDEMOND VERSTRAETE, OF CHICAGO, ILLINOIS.

UNDERGROUND CONDUIT FOR ELECTRIC CONDUCTORS.

SPECIFICATION forming part of Letters Patent No. 294,703, dated March 4, 1884.

Application filed October 23, 1883. (No model.)

*To all whom it may concern:*

Be it known that I, EDEMOND VERSTRAETE, a subject of the King of Belgium, now residing at Chicago, in the county of Cook and State of Illinois, have invented certain new and useful Improvements in Underground Conduits for Electric Conductors, of which the following is a specification, reference being had therein to the accompanying drawings, in which—

Figure 1 is a plan view of my conduit. Fig. 2 is a vertical longitudinal sectional view thereof, and Fig. 3 is a cross-sectional view.

Like letters of reference have been applied to corresponding parts in the figures.

The object of my invention is to provide a strong, durable, and perfectly water-proof conduit for electrical conductors, which may be easily and quickly constructed and readily tapped; and said invention consists in the combination of materials and arrangement of parts, as hereinafter fully set forth.

In building my conduit I have found that it expedites matters and facilitates the rapid laying thereof to construct it at the shop in sections of, say, twenty feet (more or less) in length, and then lay the same like gas or water pipes; but it obviously can be constructed and laid at one operation.

I build my conduit in two sections, A and B, placed either side by side or one above the other. The latter form, however, I find the more convenient.

In constructing my conduit I stretch a suitable number of wires in the trough A', supported and separated at intervals in any convenient manner, and another like set of wires in the trough B', forming the local section, and supported as described. The wires are drawn taut to prevent sagging, and a fluid or molten composition of four parts rosin, two parts whiting or plaster-of-paris, and one part of sawdust is poured in. As this composition cools it hardens, and, when perfectly cold, forms an excellent, durable, and perfectly water-proof insulator for the wires around which it is set. The troughs A' and B' may then be removed, if desired, the material itself, with the assistance of the wires molded in it, being sufficiently strong to prevent such injuries as are liable to come to underground electrical conductors. At the joints—where, if desired, the general direction of the conduit may be changed or branches inserted—the projecting ends of the wires are electrically connected, and a suitable short trough or shell is built around them, into which the above-described molten insulating compound is poured and allowed to set, thus securing the continuity of the system. In the section A, I place through-wires, and hence it may be covered or boxed up, or may form the under of two sections, as no connecting-wires are brought down to it. The section B, however, contains the local wires, and I employ the following means to make connection therewith. At intervals along the system I make permanent connections with one or more of the local-line wires, and I then inclose the branch wires in pieces of rubber hose D, which are carried down between the other wires, so as to protect the line-wire and secure a good hold in the insulating compound. The projection C, which is a collar or extension of the composition of which the conduit is formed, is then molded around the branch wires, and inclosing rubber tubes D within a suitable removable cylinder, C', and may be prolonged to the point where ordinary insulation is a sufficient protection against loss of current by leakage. By this means a strong and water-proof joint is formed.

A conduit constructed as above described will be found very useful where it is desired to place a system of conductors in a sewer, tunnel, or any wet or damp place, on account of its water-proof character, the facility with which connections can be made, and its extreme lightness. It may also be permanently submerged without injury.

What I claim as new is—

1. An underground conduit for electrical conductors, consisting of the section B, carrying the main conductors, and provided with projections C, forming a water-tight insulating-joint for branch wires, the whole being composed of the herein-described plastic material, adapted to be placed in position while hot, and to be self-sustaining thereafter, substantially as described.

2. A branch for electrical conduits, consisting of the rubber tube D, inclosing the branch wires and covering their junction with the main conductors, and provided with a filling of the herein-described plastic material, and also having a portion of the same built up around the exterior of the junction of said tube and conduit, as set forth.

In testimony whereof I affix my signature in presence of two witnesses.

EDEMOND VERSTRAETE.

Witnesses:
 FRANKLAND JANNUS,
 ALEXANDER J. R. FIEGO.